US 6,546,158 B2

(12) United States Patent
Fondeur et al.

(10) Patent No.: US 6,546,158 B2
(45) Date of Patent: Apr. 8, 2003

(54) TAPPED DELAY LINE BASED GAIN FLATTENING FILTER

(75) Inventors: Barthelemy Fondeur, Fontainebleau (FR); Eliseo R. Ranalli, Irvine, CA (US); Peter G. Wigley, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/902,424

(22) Filed: Jul. 10, 2001

(65) Prior Publication Data

US 2002/0054726 A1 May 9, 2002

(30) Foreign Application Priority Data

Jul. 11, 2000 (EP) .............................. 00401993

(51) Int. Cl.[7] .......................... G02B 6/26; G02F 1/035
(52) U.S. Cl. ............................... 385/3; 385/40
(58) Field of Search ........................ 385/1–10, 39–42, 385/44–48

(56) References Cited

U.S. PATENT DOCUMENTS

| 4,840,447 | A | | 6/1989 | Kataoka |
| 5,253,309 | A | | 10/1993 | Nazarathy et al. |
| 5,347,601 | A | | 9/1994 | Ade et al. |
| 5,351,317 | A | * | 9/1994 | Weber .......................... 385/27 |
| 5,832,155 | A | * | 11/1998 | Rasch et al. ................... 385/14 |
| 6,204,951 | B1 | * | 3/2001 | Coward et al. ............. 359/127 |
| 6,275,328 | B1 | | 8/2001 | Parry et al. |
| 6,411,417 | B1 | * | 6/2002 | Roberts et al. ................ 385/24 |

OTHER PUBLICATIONS

Parry, S.P. et al., "Dynamic gain equalisation of EDFAs with Fourier filters", Optical Amplifiers and Their Applications Conference, 1999 Technical Digest, pp. 161–164, 1999.
Ranalli, E. et al., "A tapped delay line optical spectrum analyzer", Optics Communications, vol. 104 (1993) pp. 13–17.
Yamada, Makoto et al., "Low–noise and gain–flattened $Er^{3+}$—doped tellurite fiber amplifier", Optical Amplifiers and Their Applications, 1998 Technical Digest, pp. 86–89, 1998.
Pan, Jin–Yi, "Fiber–Amplifier cascades with equalization employing M–Z optical filters in multiwavelength systems", Optical Amplifiers and Their Applications Conference, 1994, FA3, pp. 114–116.

* cited by examiner

Primary Examiner—Akm E. Ullah
Assistant Examiner—Michelle R. Connelly-Cushwa
(74) Attorney, Agent, or Firm—Walter M. Douglas

(57) ABSTRACT

A method of modifying the spectral distribution of an optical signal includes the steps of splitting the signal among a plurality of optical paths, delaying the propagation of the signal through one or more of the optical paths by a time duration which results in the desired spectral distribution when the signals at the output ends of each optical path are recombined, and then recombining those outputs. An apparatus for changing the spectral profile of an optical signal includes an input waveguide and a plurality of tapped delay lines. Each of the tapped delay lines has a delay element configurable to impart a predetermined delay to the signal propagating down the delay line. Couplers split an optical signal, propagating on the input waveguide, among the tapped delay lines. The delays imparted to the signals on each line are chosen so as to effect the desired change to the spectral profile.

25 Claims, 4 Drawing Sheets

TAPPED DELAY LINE BASED GAIN FLATTENING FILTER

BACKGROUND OF THE INVENTION

1. Field of the Invention

The present invention relates generally to optical filters, and more specifically to configurable filters for spectral shaping.

2. Technical Background

Actively configurable optical filters have many potential applications in optical communications, such as temporal pulse compression, dispersion slope compensation and spectral shaping. Spectral shaping is of particular interest in connection with optical amplifiers. The gain profile of a typical optical amplifier may be affected by numerous factors such as, for example, fiber length, fiber composition, splice losses, as well as the population inversion level of the dopant atoms (e.g. erbium) providing the gain. Having a relatively large optical signal at the input of the amplifier tends to deplete the excited electron population, resulting in a different spectral gain profile than that for a small input signal. Average gain also varies with input signal power.

One approach to dealing with this effect is to operate the amplifier at a constant inversion population, with a fixed spectral filter that provides gain flattening over the operating wavelength range. In this approach, the inversion level is held fixed by selectively attenuating the input signal until the desired inversion level is achieved. However, there may be circumstances where operating the amplifier at a constant gain level, rather than a constant inversion level, would be advantageous. By utilizing an actively configurable spectral filter, an amplifier could be used in a constant-gain mode, rather than constant inversion level, by flattening the gain profile of the amplifier for arbitrary inversion levels. One approach for realizing such a configurable spectral filter is to spatially disperse the various wavelength components of the input signal via a diffraction grating, then spatially modulate the dispersed components via a spatial light modulator or acoustically-formed phase grating. The polarization dependence and diffractive losses of the grating could be a drawback in some applications, however. Prisms could be used instead of a diffraction grating to eliminate polarization dependence and to decrease angular dispersion. Prisms require an increase in package size, however, which makes their use undesirable in many applications.

What is needed, then, is an actively configurable spectral filter that is polarization-independent, which can fit in a relatively small package, and which does not suffer from diffractive losses.

SUMMARY OF THE INVENTION

One aspect of the invention is an apparatus for changing the spectral profile of an optical signal that includes a plurality of optical paths, each having associated with it a delay element which imparts a predetermined delay to a signal propagating through the optical path. A plurality of couplers is configured to split the optical signal among the plurality of optical paths according to a predetermined splitting ratio. The predetermined delays and predetermined splitting ratios are chosen so as to effect the desired change to the spectral profile.

In another aspect, the delay elements may include portions of the waveguide which have an altered index of refraction. The index of refraction may, in yet another aspect, be reversibly alterable.

In another aspect, the invention includes a method for modifying the spectral distribution of an optical signal which includes the steps of splitting the signal among a plurality of optical paths, each having an output end, so that a portion of the signal propagates on each of the optical paths; changing the relative phases of the portions of the signal propagating through the optical paths; modifying the amplitudes of the portions of the signal propagating through the optical paths; and combining the portions of the signal at the output ends of the optical paths. The relative phase changes and the amplitude modifications have magnitudes that result in a desired spectral distribution when the portions of the signal at the output ends of the optical paths are combined.

In another aspect, the invention includes a method for modifying the spectral distribution of an optical signal which includes the steps of splitting the signal among a plurality of optical paths according to predetermined splitting ratios, and changing the relative phases of the portions of the signal propagating through different ones of the optical paths; the relative phase changes and the splitting ratios having magnitudes which result in a desired spectral distribution when the portions of the signal at the output ends of the optical paths are combined; and combining the portions of the signal at the output ends of the optical paths.

In another aspect, the invention includes an optical communication system comprising an optical amplifier and a spectral filter that includes an input waveguide and a plurality of tapped delay lines. Each of the tapped delay lines has a delay element configurable to impart a predetermined delay to the signal propagating down the delay line. Couplers split an optical signal, propagating on the input waveguide, among the tapped delay lines. The delays imparted to the signals on each line are chosen so as to effect the desired change to the spectral profile.

The claimed embodiments of the invention provide spectral shaping which is polarization-independent, and which, in certain embodiments, may be actively configurable or permanently configured. The spectral filtering of the invention may, if desired, be provided in a planar device, which is compact, reliable and economically fabricated. It is particularly well suited to use as a gain-flattening filter for an optical amplifier, which allows the amplifier to be used in a constant gain mode.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention. Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
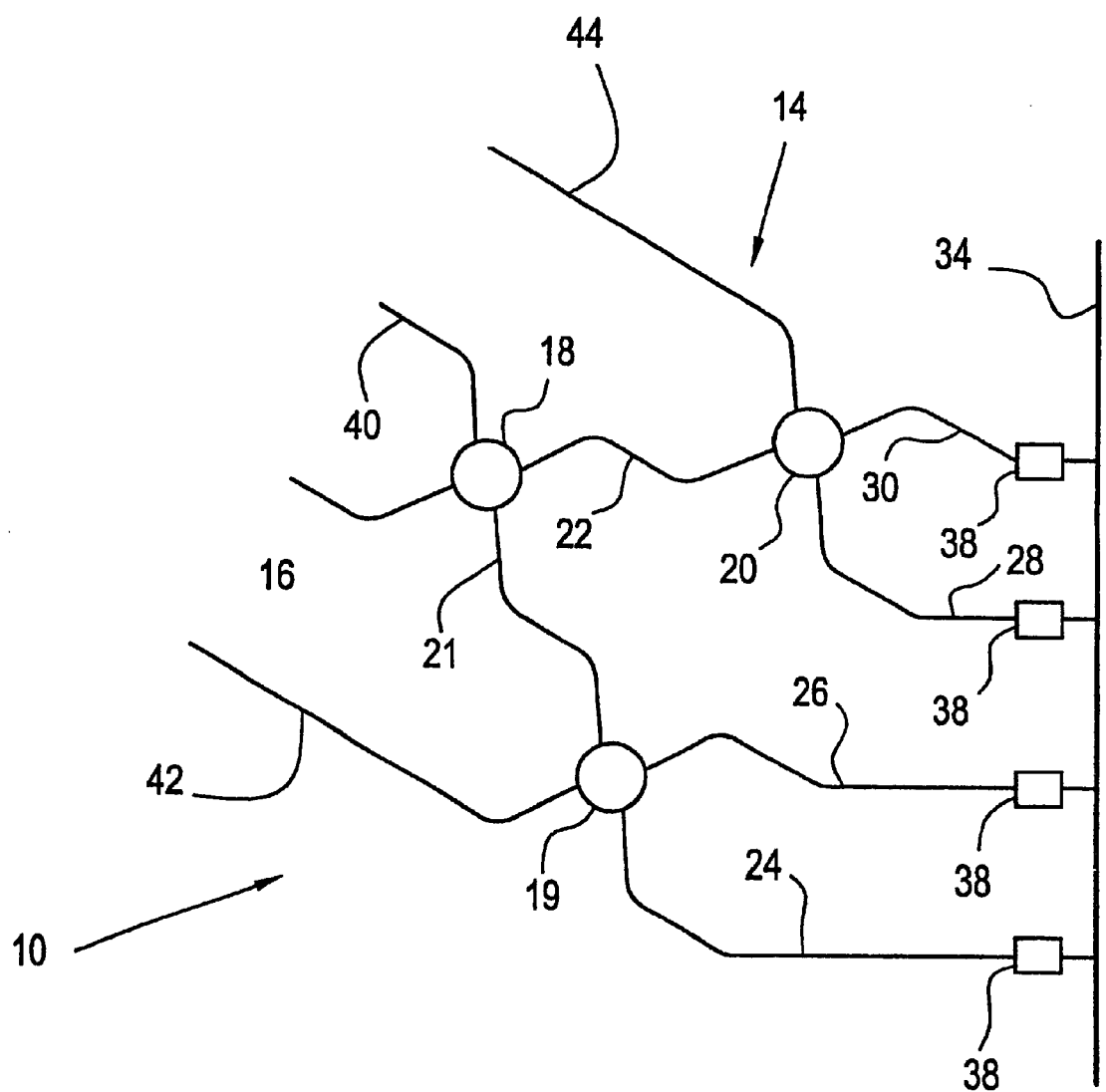
FIG. 1 is a schematic diagram of an embodiment of the invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of an apparatus for changing the spectral profile of an optical system of the present invention is shown in FIG. 1, and is designated generally throughout by reference numeral 10.

In accordance with the invention, an embodiment of the invention provides spectral shaping by employing an optical tapped delay line realization of the desired narrow-band impulse response. In this embodiment, a splitter tree partitions the incoming signal among several taps in the correct proportions for a given impulse response. Each tap imparts a nominal delay of T seconds, relative to neighboring taps. The design of the splitter tree may be chosen so that the inverse of the delay (1/T) is on the order of the free spectral range of interest, or more preferably, about twice the desired free spectral range. Delay perturbations in each tap set the approximate phase for that tap. With the splitter ratio determining amplitude, and the delay perturbations determining phase for the signal propagating down each tap, the signals output from each tap are superimposed to yield an output signal having the desired spectral shape.

As illustrated in FIG. 1, an embodiment of the present invention for changing the spectral profile of an optical signal includes an array of optical paths 14 which, in the illustrated embodiment, are configured in a splitter tree arrangement. The optical path array 14 can be an array of waveguides in a planar substrate, such as, for example, single mode silica waveguides on a silicon substrate, or waveguides on a LiNiO$_3$ substrate. In the illustrated splitter tree arrangement, a first optical path 16 directs the signal to a first coupler 18, which may be, for example, a Mach-Zehnder interferometer or other suitable variable coupler so that the coupling ratio may be selectively configured as desired. The first coupler 18 splits the signal into two portions and couples the two portions into optical paths 21, 22, each of which is optically connected to one of a second and a third coupler 19, 20 respectively, which may be any suitable variable 2×2 coupler such as a Mach-Zehnder interferometer. Each of the second and third couplers 19, 20 split the power input to it on to a pair of waveguides 24, 26 and 28, 30, respectively. In the illustrated embodiment, these waveguides act as taps, with the relative tap weights being effectively set by splitting the input power in appropriate ratios over the two stages of variable couplers made up by the first coupler 18 (in the first stage) and the second and third couplers (in the second stage). Each of the tap waveguides 24, 26, 28 and 30 has a different effective optical path length chosen so that each tap imports a nominal delay T to a signal propagating through it, relative to a neighboring tap. As illustrated, this may be accomplished by the tap waveguides having successively longer (or shorter) actual lengths. For purposes of illustration, a two-stage splitter tree is illustrated in FIG. 1. Embodiments with different numbers of stages and of tap waveguides are within the scope of the invention.

A delay element 38 is associated with each of the tap waveguides 24, 26, 28 and 30 for imparting delay perturbations to the signal traveling through that tap. The delay elements 38 may be, for example, portions of the associated waveguide which have an altered index of refraction. Altering the index of refraction in a waveguide changes the effective optical path length through that waveguide, thereby effecting a delay in propagation time, and in phase, through that waveguide. The alteration in refractive index can be a permanent alteration, or alternatively, a temporary or reversible alteration. In this alternative, the refractive index preferably could be selectively modified as desired to achieve the desired delay in propagation.

Some examples of how this modification of refractive index can be achieved include, for waveguides in a silica substrate, exposing a portion of the waveguide to UV radiation. This will result in a permanent modification of the refractive index. Temporary or reversible modifications to the refractive index can be provided for waveguides in a silica substrate by providing selectively actuated heating elements adjacent the waveguide portion for which the refractive index changes are desired. For an embodiment of the invention using waveguides in an electro-optic substrate such as LiNiO$_3$, electrodes adjacent a waveguide may be used to provide a voltage across the waveguide, which will change the refractive index in a non-permanent fashion according to the well-known electro-optic effect.

In the illustrated embodiment, the tap waveguides are reflected back on themselves by, for example, a reflector 34 at the output end of the optical paths which make up tap waveguides 24, 26, 28 and 30, reflect the portions of the signal propagating down these optical paths back through the splitter tree 14 in the opposite direction. This ensures that the couplers, which separate the input signals into the successive stages of the splitter tree and the coupling of the delayed copies of the input signals, are accomplished in the same ratios. The reflector 34 can be a polished gold-plated surface or any other suitable reflective optical element or elements. The ports 40, 42 and 44 to the first, second and third couplers 18, 19 and 20, which do receive input power may be used to probe the couplers, for system monitoring.

Figure 2:
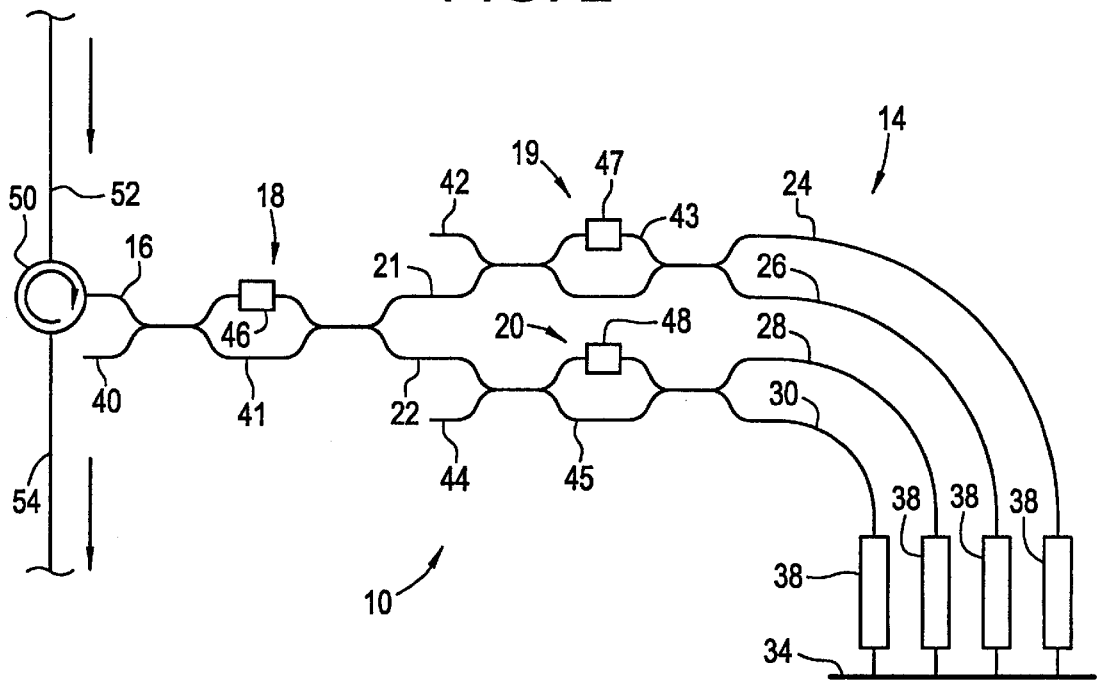
FIG. 2 is a schematic diagram of an alternate embodiment of the invention.

FIG. 2 shows an embodiment of the invention similar to that of FIG. 1, in which the first, second and third couplers 18, 19, 20 are illustrated as Mach-Zehnder interferometers 41, 43, 45, respectively. In an embodiment where the splitter tree 14 is fabricated with silica waveguides on a silicon substrate, the splitting ratios through these Mach-Zehnder elements 41, 43, 45 may be modified as desired by actuation of heating elements 46, 47, 48 adjacent the waveguide making up one arm of the Mach-Zehnder interferometer. In the embodiment of FIG. 2, a circulator 50 between the input waveguide 52 and the splitter tree 14 ensures that the reflected signal propagates to the output optical path 54. Those skilled in the art will appreciate that alternative means may be used to direct optical signals from a communication system into and out of the device 10, employing other optical components such as isolators, for example.

Figure 3:
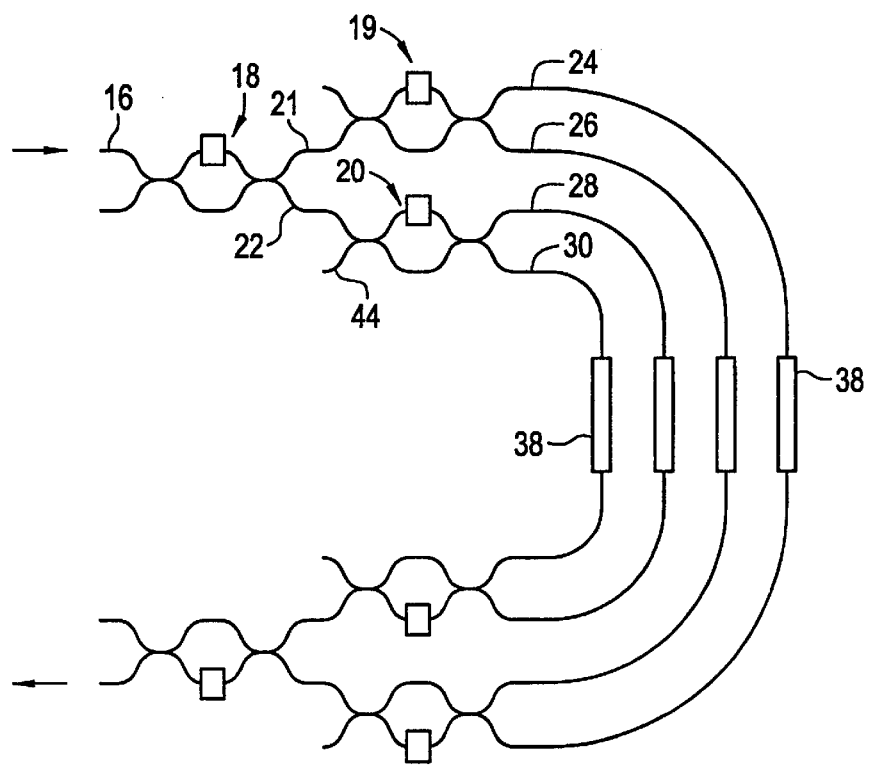
FIG. 3 is a schematic diagram of another alternate embodiment of the invention.

The embodiments of FIGS. 1 and 2 may be modified by replacing the reflector element 34 with a mirror image of the array. An example of this is illustrated in FIG. 3.

Figure 4:
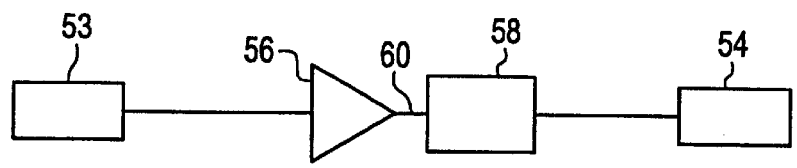
FIG. 4 is a schematic diagram of another alternate embodiment of the invention.

In another aspect of the invention, illustrated in FIG. 4, an optical communication system includes a transmitter 53, a receiver 54, an optical amplifier 56 which may be an erbium-doped fiber amplifier (EDFA), and a gain-flattening filter 58. The gain-flattening filter can be a spectral filter 10 as illustrated in FIG. 1, 2 or 3. A waveguide 60 propagates a signal from the amplifier 56 to the gain flattening filter 58. In this aspect, the splitting ratios and delays for the embodiment illustrated in FIG. 1, 2 or 3 would preferably be chosen to provide a gain flattening effect to the output of the optical amplifier 58.

Figure 5:
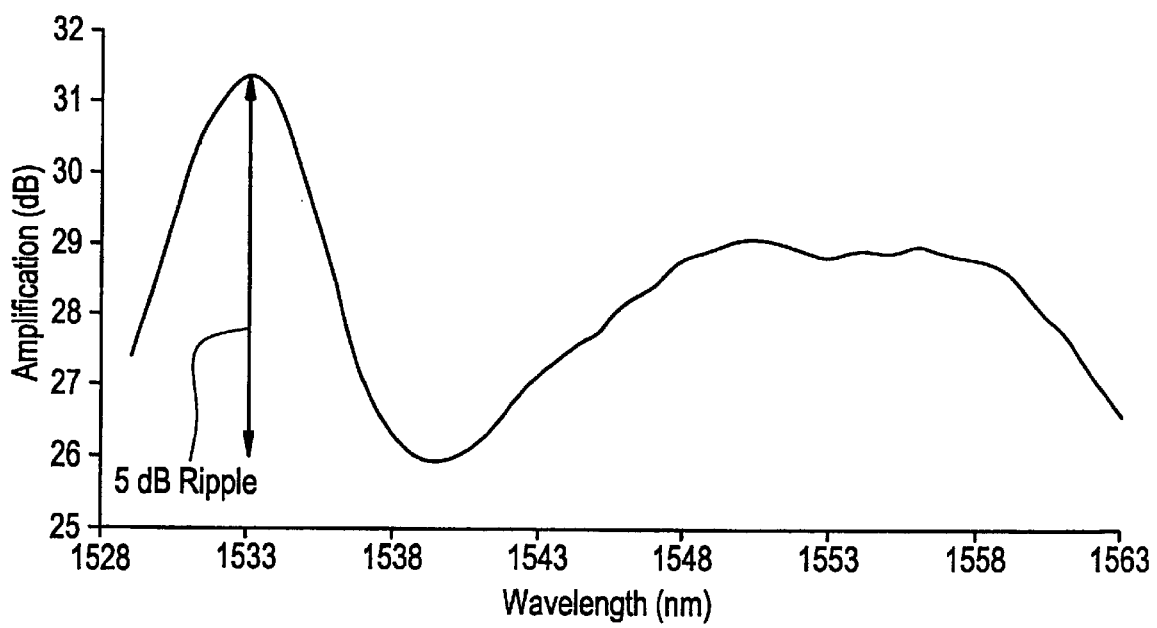
FIG. 5 is a graph showing a gain spectrum for an EDFA before gain flattening.

For example, suppose it is desired to realize a gain-flattening filter for an erbium-doped fiber amplifier (EDFA), operating over the C-band (roughly 1530–1560 nm), with 8 taps. In this particular example, the parameters will be chosen so that the device optimally flattens the gain of the amplifier at a population inversion level of 65%, the expected operating condition for a particular amplifier design. FIG. 5 shows the spectral gain profile for the amplifier at that inversion level. It is recognized that the spectral measurement is noisy, and the optimization should be robust enough to accommodate this limitation.

Calculation of the appropriate complex tap weights may be done using MathCAD software, and an annotated MathCAD script is given in Appendix—Part 1 to illustrate an example of appropriate steps taken in designing a device to realize such a function. Spectral scans at several inversion levels are recorded in the file, C-Band.txt, from which the design wavelengths (indicated by the vector k-Design) and gains (indicated by the matrices: y in dB units, A in absolute units) are extracted.

The Nyquist (sampling) theorem ordinarily dictates that the sampling interval T be chosen to correspond to the inverse of twice the frequency range of interest. In the present design example, this criterion would lead to the specification T=110 fsec. However, this should not be interpreted as a rigid constraint, and in fact a minimum least square error solution is actually obtained from 185 fsec. In fact, if the Nyquist theorem is followed blindly, there is also the very real possibility that a quite lossy system will result, since the range over which the desired response is specified is only half the free spectral range (in fact, it is this condition which insures that there is absolutely no aliasing), and over the other half may be where the transmission maximum occurs. This possibility follows from the constraint that a given tap weight cannot exceed unity. Thus, some searching for an optimal T must occur in general. For a given T however, optimization proceeds as follows.

The first step is to quickly arrive at a linear least mean-square (LMS) solution. This leads to a solution for the complex tap coefficients which is obtained by representing the system transfer function as a weighted (by the tap coefficients) superposition of sinusoids in the frequency domain. Under such an optimization paradigm, the transfer function to be approximated must be specified both in amplitude and phase. Since the design task simply specifies the amplitude of the desired spectral response, the phase can be any arbitrary function. The phase functions $\Phi$ in Appendix—Part 1 were chosen based on a minimum-phase criterion. In the same way that the real and imaginary parts of the refractive index are related in dielectric materials, the principle of causality leads to this relationship between the amplitude and phase of a linear, causal system. Clearly, this is not the only phase relationship that can exist for a given amplitude of response, and in fact a non-linear optimization leads to a different function, as will be explained shortly. However, it is necessary to initiate the optimization at a reasonable starting point, and in this example, this function provides that initial guess.

Thus, with amplitude and phase determined, the target transfer function H is completely specified. The graphs of $\lambda_{13}$design$_k$ versus $|H_{k,3}|$ and $\Phi_{k,3}$ illustrate the amplitude and phase for this function, chosen for N=3, where the population inversion is 65%. In the present example, the number of taps, indicated by the constant, Taps, is 8. The complex cumulants are then computed for the LMS estimation of the complex tap weights, represented by the vector h, which is then normalized and presented graphically in the MathCAD script. From this, two frequency responses are derived: H2 and H3. H3 represents the response of an ideal tapped delay line system, for which h is not frequency dependent, while H2 represents the response for a system in which the phase is allowed to vary over the frequency range in a way consistent with approximating a desired phase by a constant delay over a narrow range of frequencies. The graphs of $\lambda$_Data$_m$ verses $|H_{2\ m}|$ and $|H_{\ 3m}|$ show the difference between the two functions. There is little difference between the functions, validating the assumption that for this narrow-band system, a constant delay is a good approximation to a constant phase. Over the frequency range of interest in the example, the RIMS ripple in the compensated output is only 0.2 dB.

As mentioned above, the linear prediction may be used as a starting point for optimization for a given design. Once h is found in this way, a non-linear optimal solution may be found by entering the elements of h into the C program shown in Appendix—Part 2, which randomly perturbs the real and imaginary components of h in such a way as to minimize the RMS error in the gain-compensated ripple, after an appropriate number of trials and with simulated annealing.

Figure 6:
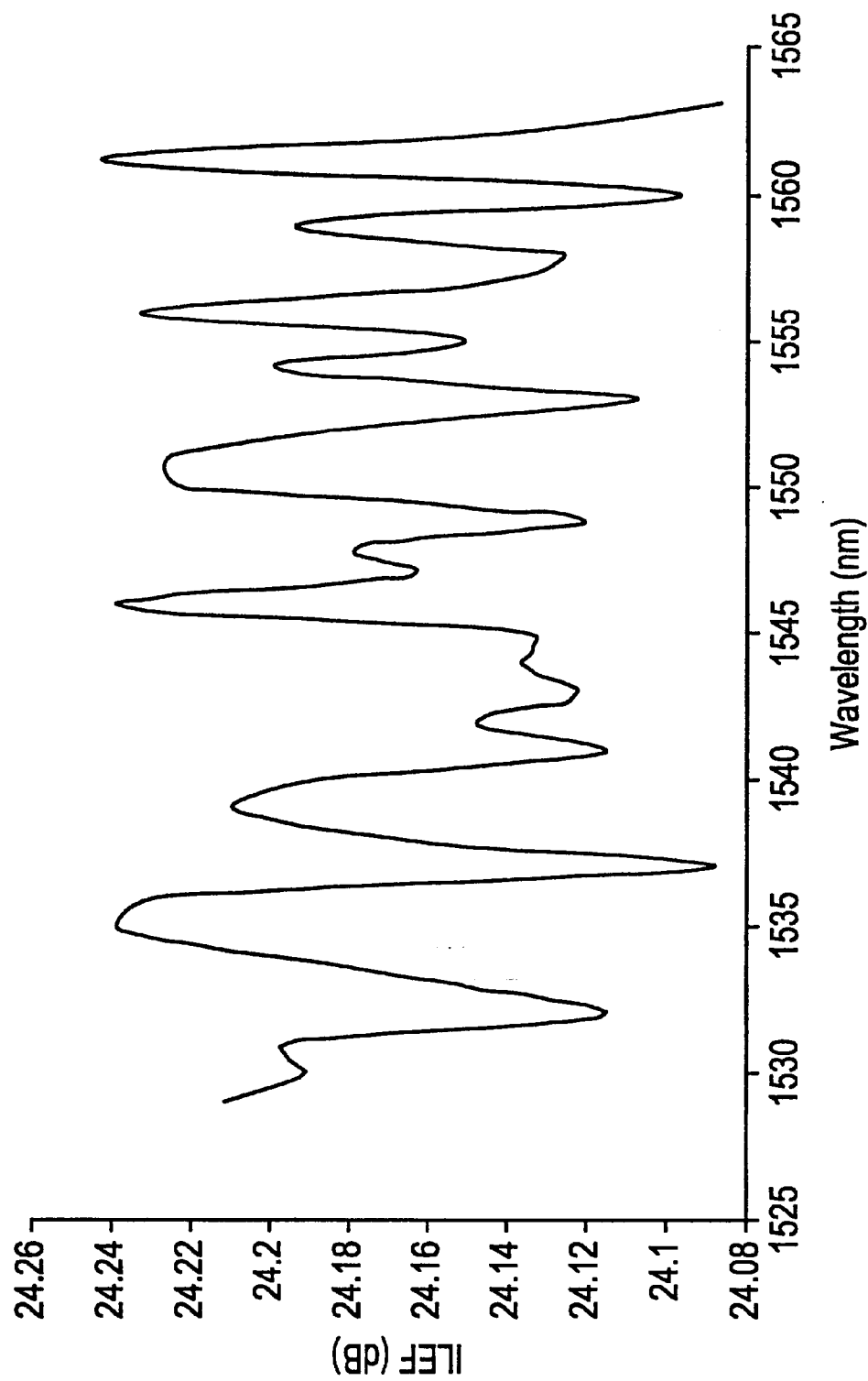
FIG. 6 is a graph showing a gain spectrum for an EDFA after gain flatteneing.

Following this non-linear optimization, the optimal impulse response coefficients (i.e. the elements of h), given in Appendix-Part 3, show that the RMS ripple has been reduced to a mere 0.047 dB. As can be seen in FIG. 6, this ripple is most likely due to random error in the data.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

Appendix – Part 1

Data which, in this example, consists of gains for 71 wavelengths at 11 inversion levels, is read in:

Spectra="C-Band.txt"

V := READPRN( Spectra )

M := 71    N := 11 m := 0 .. M − 1
n := 0 .. N − 1

Data wavelengths $$\lambda\_Data_m := V_{m+1,0}$$

Inversion levels $$n2_n := V_{0, n+15}$$

Design wavelengths. In this example, only the useful portion of the gain curves are of interest.

k := 0 .. 34

$$\lambda\_Design_k := \lambda\_Data_k$$

Radian frequencies:

$$\omega_m := \frac{2 \cdot \pi \cdot 3 \cdot 10^8}{\lambda\_Data_m \cdot 10^{-9}}$$

Gains at k'th wavelength, n'th inversion level, in dB $$\gamma_{k,n} := V_{k+1, n+15}$$

Corresponding sampling rate, in seconds.

$$T := 1.85 \cdot 10^{-13}$$

Absolute spectral response.

$$A_{k,n} := 10^{\frac{\gamma_{k,n}}{10}}$$

12

Mean radian frequency for n'th inversion level.

$$\Omega_n := \frac{\sum_k A_{k,n} \cdot \omega_k}{\sum_k A_{k,n}}$$

Create a phase profile, based on a minimum-phase criterion. Assume spectrum to repeat after a free spectral range $$s := 0..34 \qquad p := -5..5$$

$$\Phi_{k,n} := \frac{1}{2\cdot\pi} \cdot \sum_p \left[ \sum_s \text{if}\left[ (p\cdot 35 + k - s) = 0, 0, \frac{\ln(A_{s,n})}{p\cdot 35 + k - s} \right] \right]$$

$$\phi_{k,n} := \text{mod}(\Phi_{k,n}, \pi\cdot 2) \qquad j := \sqrt{-1}$$

Desired transfer function for gain compensation at n'th inversion level (choice of numerator sets desired gain).

$$H_{k,n} := \frac{1}{\sqrt{A_{k,n}}} \cdot \exp(-j\cdot\phi_{k,n})$$

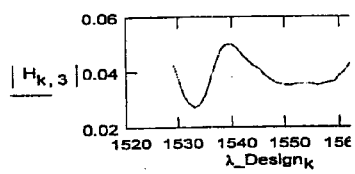
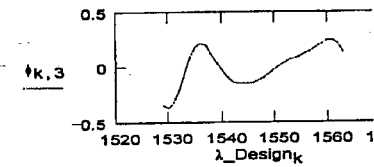

Number of waveguide taps (in this example, 8 taps).

Taps := 8

Choice for an inversion level at which to operate.

N := 3

$n2_N = 0.65$

Frequency response vector and matrix for least mean square (LMS) error computation.

t := 0 .. Taps − 1     u := 0 .. Taps − 1

$$v_t := \sum_k H_{k,N} \cdot \exp(j \cdot \omega_k \cdot T \cdot t)$$

$$M_{t,u} := \sum_k \exp[j \cdot \omega_k \cdot T \cdot (t - u)]$$

Impulse response vector which gives the LMS error.

$h := M^{-1} \cdot v$

Normalize impulse response.

$$\text{Norm} := \sum_t |h_t|$$

$$h_t := \frac{h_t}{\text{Norm}}$$

$\text{Amplitude}_t := |h_t|$ $$\sum_t (|\text{Amplitude}_t|)^1 = 1$$

14

Amplitude and phase of the impulse response which gives the minimum RMS error for the chosen number of taps, at the chosen inversion level:

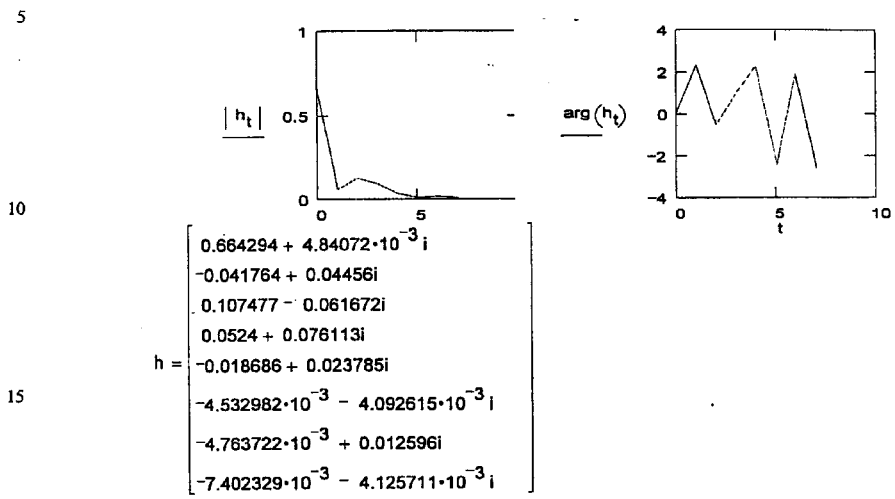

$$h = \begin{bmatrix} 0.664294 + 4.84072 \cdot 10^{-3} i \\ -0.041764 + 0.04456i \\ 0.107477 - 0.061672i \\ 0.0524 + 0.076113i \\ -0.018686 + 0.023785i \\ -4.532982 \cdot 10^{-3} - 4.092615 \cdot 10^{-3} i \\ -4.763722 \cdot 10^{-3} + 0.012596i \\ -7.402329 \cdot 10^{-3} - 4.125711 \cdot 10^{-3} i \end{bmatrix}$$

Actual frequency response of Tapped Delay Line (TDL) system.

$$H2_m := \sum_t |h_t| \cdot \exp\left[ j \cdot \omega_m \cdot \left( \frac{\arg(h_t)}{\Omega_N} \right) \right] \cdot \exp(-j \cdot \omega_m \cdot t \cdot T)$$

Frequency response of ideal LMS TDL system.

$$H3_m := \sum_t h_t \cdot \exp(-j \cdot \omega_m \cdot t \cdot T)$$

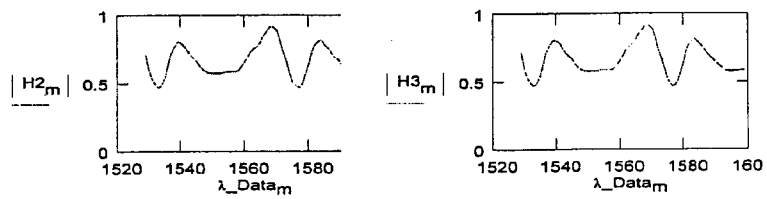

Gain compensation: Amplifier + TDL filter:

$$\text{Comp}_k := 10 \cdot \log\left[\left|A_{k,N} \cdot (|H2_k|)^2\right|\right]$$

$$\mu := \frac{\sum_k \text{Comp}_k}{\sum_k 1}$$

Normalize impulse response.

$$\text{Norm} := \sum_t (|h_t|)$$

$$h_t := \frac{h_t}{\text{Norm}}$$

$\mu = 24.340649$

| $|h_t|$ | $\arg(h_t)$ |
|---|---|
| 0.664311 | $7.286887 \cdot 10^{-3}$ |
| 0.061072 | 2.323812 |
| 0.123914 | -0.520946 |
| 0.092406 | 0.967871 |
| 0.030248 | 2.236701 |
| $6.107161 \cdot 10^{-3}$ | -2.407204 |
| 0.01346 | 1.932358 |
| $8.47443 \cdot 10^{-3}$ | -2.633122 |

$\max(\text{Comp}) - \min(\text{Comp}) = 0.675054$ max Ripple in dB $$\sqrt{\frac{\sum_k (\text{Comp}_k - \mu)^2}{\sum_k 1}} = 0.207617 \quad \text{RMS Ripple}$$

Appendix – Part 2

```
/* AGFF_1.c */

/* This program performs non-linear optimization of the complex tap weights
   for the active gain flattening filter, starting from the LMS predicted
   tap weights from the MathCad simulations.
*/ include <stdio.h>
include <stdlib.h>
#include <math.h>

/* Constants */ int const Taps = 8;
double const T = 1.85E-13;          /* Sampling interval.
int const Trials = 10000;           /* Number of trials in search for optimal tap coefficients.
double const Step = 0.001;          /* Step size for coefficient perturbation.

/* Variables */ int m,n,k,Last_m;
float Dummy;
int Num;                            /* Number of frequencies considered.
int Lambda[100];                    /* Wavelengths in nm. Contained in first column of the file Spec
double Omega[100];                  /* Corresponding omega's.
double arg[100];                    /* Product of omega and sampling interval.
double Gain[100];
double Target[100];
double Hurdle;                      /* Successively lowest ILEF values.
double h_Ref;                       /* Dummy variable for perturbing Re and Im parts of impulse resp
FILE *Spectrum;                     /* File contains spectrum to be flattened.
FILE *Outfile;                      /* File contains optimized impulse response;
double h[16] = { 0.968829,        0.00705988,
                -0.060909,         0.064988,
                 0.156748,        -0.089945,
                 0.076421,         0.111006,
                -0.027252,         0.03469,
                -0.00661106,      -0.005968813,
                -0.0069476,        0.018371,
                -0.010796,        -0.006017082};

/* Functions */ double S(int ComputedAt);           /* Computes the spectrum for the as-then defined
                                        complex impulse response, at the radian frequency
                                        indexed by the integer ComputedAt.
double ILEF();                      /* Resultant ILEF.

main(argc, argv)
int argc;
char **argv;

{
    Spectrum = fopen("a:\Gain.txt","r");
    Outfile = fopen("a:\h.txt","w");

/* Read in gain data. First column is wavelength, second is gain, in dB.
   The wavelengths should only cover the range we're interested in flattening.
   After reaching EOF, the variable Num will represent the number of wavelengths
   represented in this range.
*/

Num = 0;
    while (fscanf(Spectrum,"%d %f \n",&Lambda[Num],&Dummy) != EOF)
    {
        Gain[Num] = pow(10,Dummy/10);
        Omega[Num] = 1.884956E18/(float)Lambda[Num];
```

17

```
        arg[Num] = Omega[Num]*T;
        Num++;
    }

/* Compute inverse function for 25 dB overall gain */
    for(m=0;m<Num;m++) Target[m] = 316/Gain[m];

Hurdle = ILEF();            /* Initiates search. */
    Last_m = 0;m = 0;
    for(n=0;n<Trials;n++)
    {
        while(m==Last_m) m = (int)floor(2.0*Taps*rand()/(float)RAND_MAX);
        h_Ref = h[m];
        h[m] += Step;
        while(ILEF()<Hurdle) {
                                Hurdle = ILEF();
                                h_Ref = h[m];
                                h[m] += Step;
                            };
        h[m] = h_Ref;
        h[m] -= Step;
        while(ILEF()<Hurdle) {
                                Hurdle = ILEF();
                                h_Ref = h[m];
                                h[m] -= Step;
                            };
        h[m] = h_Ref;
        Last_m = m;

} printf(" %f \n",Hurdle);
    for(m=0;m<Taps;m++) printf(" %f %f \n",h[2*m],h[2*m+1]);
    for(m=0;m<Taps;m++) fprintf(Outfile," %f %f \n",h[2*m],h[2*m+1]);

fclose(Spectrum);
    fclose(Outfile);

} double S(int At)
{
    double Dummy_Re,Dummy_Im;
    Dummy_Re = 0;
    Dummy_Im = 0;
    for(k=0;k<Taps;k++)
    {
        Dummy_Re += h[2*k]*cos(arg[At]*k) + h[2*k+1]*sin(arg[At]*k);
        Dummy_Im += h[2*k+1]*cos(arg[At]*k) - h[2*k]*sin(arg[At]*k);
    }
    return (Dummy_Re*Dummy_Re + Dummy_Im*Dummy_Im);
} double ILEF()
{
    double min,max,Dummy;
    int m;
    min = 10*log10(S(0)*Gain[0]);
    max = min;
    for(m=1;m<Num;m++)
    {
        Dummy = 10*log10(S(m)*Gain[m]);
        if(Dummy>max) max = Dummy;
        if(Dummy<min) min = Dummy;

}
    return (max-min);
}
```

18

Appendix – Part 3

Amplitude and phase of the impulse response which gives the minimum RMS error for the chosen number of taps, at the chosen inversion level:

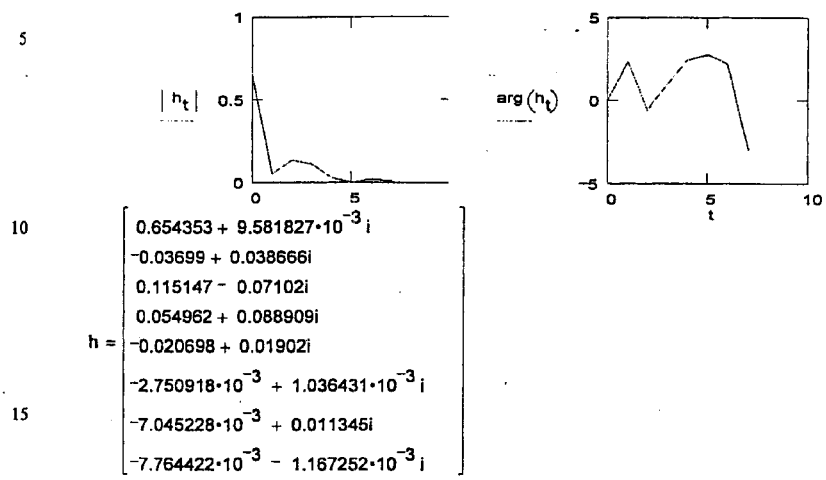

$$h = \begin{bmatrix} 0.654353 + 9.581827 \cdot 10^{-3}\,i \\ -0.03699 + 0.038666i \\ 0.115147 - 0.07102i \\ 0.054962 + 0.088909i \\ -0.020698 + 0.01902i \\ -2.750918 \cdot 10^{-3} + 1.036431 \cdot 10^{-3}\,i \\ -7.045228 \cdot 10^{-3} + 0.011345i \\ -7.764422 \cdot 10^{-3} - 1.167252 \cdot 10^{-3}\,i \end{bmatrix}$$

Actual frequency response of TDL system.

$$H2_m := \sum_t |h_t| \cdot \exp\left[j \cdot \omega_m \cdot \left(\frac{\arg(h_t)}{\Omega_N}\right)\right] \cdot \exp(-j \cdot \omega_m \cdot t \cdot T)$$

Frequency response of ideal LMS TDL system.

$$H3_m := \sum_t h_t \cdot \exp(-j \cdot \omega_m \cdot t \cdot T)$$

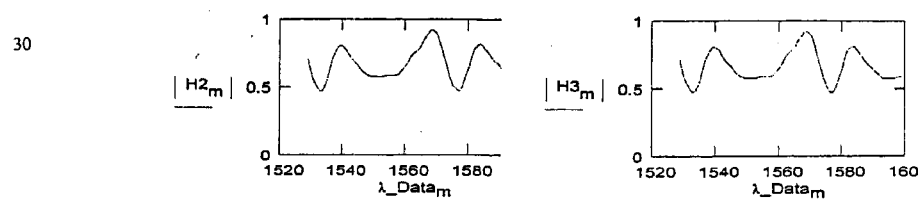

19

Gain compensation:

Amplifier + TDL filter:

$$\text{Comp}_k := 10 \cdot \log\left[\left|A_{k,N} \cdot (|H2_k|)^2\right|\right]$$

$$\mu := \frac{\sum_k \text{Comp}_k}{\sum_k 1}$$

Normalize impulse response.

$$\text{Norm} := \sum_t (|h_t|)$$

$$h_t := \frac{h_t}{\text{Norm}}$$

$\mu = 24.169417$

| $|h_t|$ | $\arg(h_t)$ |
|---|---|
| 0.654423 | 0.014642 |
| 0.05351 | 2.334039 |
| 0.135287 | -0.552664 |
| 0.104525 | 1.017118 |
| 0.02811 | 2.398415 |
| $2.939684 \cdot 10^{-3}$ | 2.781281 |
| 0.01335 | 2.126527 |
| $7.851671 \cdot 10^{-3}$ | -2992377 |

$\max(\text{Comp}) - \min(\text{Comp}) = 0.156938$ max Ripple in dB $$\sqrt{\frac{\sum_k (\text{Comp}_k - \mu)^2}{\sum_k 1}} = 0.047031 \quad \text{RMS Ripple}$$

What is claimed is:

1. An apparatus for polarization independent changing of the spectral profile of an optical signal comprising:
   a plurality of optical paths without a polarization rotation element, each of said optical paths having associated therewith a delay element which imparts a predetermined delay to a signal propagating through the optical path;
   a plurality of couplers configured to split the optical signal among said plurality of optical paths according to predetermined splitting ratios;
   wherein said predetermined delays and predetermined splitting ratios are chosen so as to effect the desired change to said spectral profile.

2. The apparatus of claim 1 wherein said predetermined delays and said predetermined splitting ratios are variable.

3. The apparatus of claim 2, wherein said waveguides comprise waveguides in electro-optic material and said delay elements include electrodes adjacent said waveguides.

4. The apparatus of claim 1 wherein said optical paths comprise waveguides and said delay elements include portions of said optical paths with an altered index of refraction.

5. The apparatus of claim 4 wherein said altered index of refraction is permanently altered.

6. The apparatus of claim 5 wherein said waveguides comprise silica waveguides, and said portions of said optical paths with an altered index of refraction comprise portions of said silica waveguides which have been exposed to UV radiation.

7. The apparatus of claim 4, wherein said waveguides comprise silica waveguides and said delay elements include heating elements adjacent said waveguides.

8. The apparatus of claim 4 wherein said index of refraction is selectively reversibly alterable.

9. The apparatus of claim 8 wherein said optical paths comprise waveguides forming a splitter tree.

10. The apparatus of claim 9 wherein said splitter tree has an input end and an output end, and further comprising a reflector at said output end.

11. The apparatus of claim 4, wherein said optical paths comprise waveguides forming a splitter tree.

12. The apparatus of claim 11 wherein said splitter tree has an input end and an output end, and further comprising a reflector at said output end.

13. The apparatus of claim 1 further comprising an optical amplifier and an optical path between said optical amplifier and said coupler.

14. A polarization independent gain flattening filter for use with an optical amplifier comprising:
   an input waveguide;
   a plurality of tapped delay lines comprising waveguides and delay elements associated with said waveguides, but without a polarization rotation element;
   a plurality of variable couplers configured to split an optical signal propagating on said input waveguide among said plurality of tapped delay lines according to predetermined splitting ratios;
   wherein each of said delay elements is configurable to impart a predetermined delay to the signal propagating down the associated waveguide, wherein said predetermined delays are chosen so as to effect a flattening of the spectral profile of said optical signal.

15. The gain-flattening filter of claim 14 wherein said tapped delay lines comprise waveguides formed in a planar substrate.

16. The gain-flattening filter of claim 14 wherein said delay elements comprise selectively actuated resistive heating elements near said associated waveguides.

17. The gain-flattening filter of claim 16 wherein said regions of said associated waveguides comprise regions which have been exposed to UV radiation.

18. The gain-flattening filter of claim 14 wherein said delay elements comprise regions of said associated waveguides having a propagation coefficient which differs from that of the remainder of said associated waveguide.

19. An optical communication system comprising:
   an optical amplifier;
   a polarization independent spectral filter comprising an input waveguide;
   a plurality of tapped delay lines, each of said tapped delay lines including a delay element on said line, but without a polarization rotation element;
   a plurality of couplers configured to split an optical signal propagating on said input waveguide among said plurality of tapped delay lines according to predetermined splitting ratios;
   wherein said delay elements are configurable to impart a predetermined delay to the signal propagating down said line, wherein said predetermined delays are chosen so as to effect the desired change to said spectral profile; and
   an optical path between said amplifier and said filter.

20. A method for the polarization independent modifying of the spectral distribution of an optical signal comprising the steps of:
   splitting the signal among a plurality of optical paths which do not include a polarization rotation element in said path, each having an output end, whereby a portion of the signal propagates on each of the optical paths;
   changing the relative phases of the portions of the signal propagating through the optical paths;
   modifying the amplitudes of the portions of the signal propagating through the optical paths;
   the relative phase changes and the amplitude modifications having magnitudes which result in a desired spectral distribution when the portions of the signal at the output ends of the optical paths are combined; and
   combining the portions of the signal at the output ends of the optical paths.

21. The method of claim 20 wherein the step of changing the relative phases comprises delaying the propagation of the portion of the signal in at least one of the optical paths by an amount different from the others of said optical paths.

22. The method of claim 21 wherein the amplitude modifying step comprises applying weighting coefficients to the portions of the signal propagating through the optical paths.

23. The method of claim 22 wherein the delaying step further comprises modifying the refractive indices of each of said plurality of the optical paths.

24. The method of claim 23 further comprising the steps of:
   determining the magnitude of each of said delays necessary to result in the desired spectral distribution; and
   modifying the refractive index of each of the optical paths by an amount which results in the determined delay magnitude.

25. A method for polarization independent modifying the spectral distribution of an optical signal comprising the steps of:

splitting the signal among a plurality of optical paths, which do not include polarization rotation elements in said paths, having output ends according to predetermined splitting ratios;

changing the relative phases of the portions of the signal propagating through different ones of the optical paths; the relative phase changes and the splitting ratios having magnitudes which result in a desired spectral distribution when the portions of the signal at the output ends of the optical paths are combined; and combining the portions of the signal at the output ends of the optical paths.

* * * * *